US008286075B2

(12) United States Patent
Puthiyaveettil

(10) Patent No.: US 8,286,075 B2
(45) Date of Patent: Oct. 9, 2012

(54) REDUCING RESOURCE REQUIREMENTS WHEN TRANSFORMING SOURCE DATA IN A SOURCE MARKUP LANGUAGE TO TARGET DATA IN A TARGET MARKUP LANGUAGE USING TRANSFORMATION RULES

(75) Inventor: Manikantan Vannadil Puthiyaveettil, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1577 days.

(21) Appl. No.: 11/308,655

(22) Filed: Apr. 19, 2006

(65) Prior Publication Data

US 2007/0214411 A1   Sep. 13, 2007

(30) Foreign Application Priority Data

Mar. 7, 2006   (IN) .............................. 393/CHE/2006

(51) Int. Cl.
G06F 17/00 (2006.01)
(52) U.S. Cl. .......................... 715/236; 715/234; 715/239
(58) Field of Classification Search .................... 715/236
See application file for complete search history.

(56) References Cited

U.S. PATENT DOCUMENTS

| | | | | |
|---|---|---|---|---|
| 7,073,120 B2 * | 7/2006 | Torii et al. | ...................... | 715/239 |
| 7,146,565 B2 * | 12/2006 | Toyama et al. | ................ | 715/239 |
| 7,392,468 B2 * | 6/2008 | Igata et al. | ...................... | 715/203 |
| 7,437,666 B2 * | 10/2008 | Ramarao et al. | ............... | 715/235 |
| 7,480,856 B2 * | 1/2009 | Jones | .............................. | 715/234 |
| 7,530,017 B2 * | 5/2009 | Kinno et al. | ..................... | 715/249 |
| 2002/0143821 A1 * | 10/2002 | Jakubowski | ................... | 707/522 |
| 2003/0037076 A1 * | 2/2003 | Bravery et al. | ............... | 707/517 |
| 2004/0034830 A1 * | 2/2004 | Fuchs et al. | ................. | 715/501.1 |
| 2004/0187076 A1 * | 9/2004 | Ki et al. | .......................... | 715/513 |
| 2004/0268231 A1 * | 12/2004 | Tunning | ......................... | 715/513 |
| 2004/0268249 A1 * | 12/2004 | Fennelly et al. | .............. | 715/523 |
| 2005/0060648 A1 * | 3/2005 | Fennelly et al. | .............. | 715/523 |
| 2005/0086584 A1 * | 4/2005 | Sampathkumar et al. | . | 715/501.1 |
| 2006/0101332 A1 * | 5/2006 | Imielinski et al. | ............ | 715/513 |

* cited by examiner

Primary Examiner — Laurie Ries
Assistant Examiner — Zaida I Marrero
(74) Attorney, Agent, or Firm — Narendra Reddy Thappeta

(57) ABSTRACT

Transforming source data in a source markup language to target data in a target markup language using transformation rules mapping source tags to corresponding target tags. In an embodiment, the transformation rules (e.g., in an XSL) are preprocessed to identify and store source tags ("referenced tags"), which need to be processed to apply the transformation rules of other source tags. The source tags in the source data (e.g., XML) are retrieved sequentially (e.g., by SAX parser) and the contents are stored in memory if the source tag is one of the identified referenced tags. The target tags are generated (e.g., as XML) using the contents stored in memory for another source tag matching a transformation rule immediately upon reading the source tag. Only a few of the contents of source tags and the identifiers of the referenced tags may need to be stored in memory. As a result, the memory requirements may be reduced.

20 Claims, 6 Drawing Sheets

```
401: <?xml version="1.0"?>
402: <xsl:stylesheet xmlns:xsl="http://www.w3.org/1999/XSL/Transform" version="1.0">
403:   <xsl:output method="xml" indent="yes"/>
404: <xsl:template match="/">
405:
406: <xsl:for-each select="PurchaseOrder/Header">
407: <PO>
408:         <PONumber> <xsl:value-of select="PONumber"/></PONumber>
409:         <PurchaserID>    <xsl:value-of select="CustomerID"/></PurchaserID>
410:         <PurchaserType><xsl:value-of select="CustomerType"/></PurchaserType>
411:         <xsl:for-each select="Line">
412:         <Item>
413:                 <ItemNumber> <xsl:value-of select="ItemNo"/></ItemNumber>
414:                 <xsl:choose>
415:                 <xsl:when test="../CustomerType='Gold'">
416:                         <TotalPrice>
417:                                 <xsl:value-of select="Price*0.9"/>
418:                                 <xsl:value-of select="../Currency"/>
419:                         </TotalPrice>
420:                 </xsl:when>
421:                 <xsl:otherwise>
422:                         <TotalPrice>
423:                                 <xsl:value-of select="Price"/>
424:                                 <xsl:value-of select="../Currency"/>
425:                         </TotalPrice>
426:                 </xsl:otherwise>
427:                 </xsl:choose>
428:         </Item>
429:         </xsl:for-each>
430: </PO>
431: </xsl:for-each>
432: </xsl:template>
433: </xsl:stylesheet>
```

FIG. 4A

```
470: PurchaseOrder/Header/CustomerType
475: PurchaseOrder/Header/Currency
```

FIG. 4B

```
501: <?xml version="1.0" encoding="UTF-8"?>
502: <PurchaseOrder>
503:   <Header>
504:     <PONumber>1234</PONumber>
505:     <SupplierName>MySupplier</SupplierName>
506:     <CustomerName>MyCustomer</CustomerName>
507:     <CustomerID>Cust01</CustomerID>
508:     <Currency>USD</Currency>
509:     <CustomerType>Gold</CustomerType>
510:     <Line>
511:       <ItemNo>1001</ItemNo>
512:       <ItemName>Item001</ItemName>
513:       <Price>10000</Price>
514:     </Line>
515:     <Line>
516:       <ItemNo>1002</ItemNo>
517:       <ItemName>Item002</ItemName>
518:       <Price>1800</Price>
519:     </Line>
520:   </Header>
521: </PurchaseOrder>
```

FIG. 5A

```
551: <?xml version="1.0" encoding="UTF-8"?>
552: <PO>
553:   <PONumber>1234</PONumber>
554:   <PurchaserID>Cust01</PurchaserID>
555:   <PurchaserType>Gold</PurchaserType>
556:   <Item>
557:     <ItemNumber>1001</ItemNumber>
558:     <TotalPrice>9000USD</TotalPrice>
559:   </Item>
560:   <Item>
561:     <ItemNumber>1002</ItemNumber>
562:     <TotalPrice>1620USD</TotalPrice>
563:   </Item>
564: </PO>
```

FIG. 5B

REDUCING RESOURCE REQUIREMENTS WHEN TRANSFORMING SOURCE DATA IN A SOURCE MARKUP LANGUAGE TO TARGET DATA IN A TARGET MARKUP LANGUAGE USING TRANSFORMATION RULES

RELATED APPLICATIONS

The present application is related to and claims priority from the co-pending India Patent Application entitled, "Reducing Resource Requirements When Transforming Source Data in a Source Markup Language to Target Data in a Target Markup Language using Transformation Rules", Serial Number: 393/CHE/2006, Filed: Mar. 7, 2006, naming the same inventors as in the subject patent application.

BACKGROUND OF THE INVENTION

1. Field of the Invention

The present invention relates to markup languages, and more specifically to a method and apparatus for transforming source data in a source markup language to target data in a target markup language.

2. Related Art

A markup language is a notation for representing text intermingled with markup instructions (commonly known as tags) that indicate the role of the text, for example, about the text's structure (what the text signifies) or presentation. The text, whose role is specified by a tag, is conveniently referred to as content of the tag. An example of a markup language commonly used is the extensible markup language (XML).

There are several markup languages, potentially used to represent the same information. Such different markup languages provide different views of the same data/information by adding meaning to the way information is coded and processed. Different markup languages have evolved due to reasons such as historical evolution and lack of common standards.

There is often a need to transform data ("source data") in one markup language to data ("target data") in another markup language. Such a need may be presented due to applications requiring data in the corresponding markup language. Accordingly, if the source data is present in a different markup language, the target data needs to be generated in a target markup language consistent with the requirements of the application designed to process the information.

Typically, a set of transformation rules is specified for mapping the source data in a source markup language to target data in a target markup language. A processor executes a set of instructions by which source data is transformed into target data based on the set of transformation rules. For example, XML Style Language (XSL) is one of several languages used to specify transformation rules to transform source XML to target XML or HTML.

Several prior approaches are used for transformation of source data to target data based on such transformation rules. In one prior approach, a processor generates a hierarchy of memory objects representing the entire source data sought to be transformed, and applies the set of transformation rules on the data in the memory objects to generate the target data. The memory objects are stored in a random access memory (RAM) and the hierarchy is often viewed as a Document Object Model (DOM), as is well known in the relevant arts.

One disadvantage with such an approach is that the RAM size requirement may be proportionate to the size of the source data (since the entire data is represented in the hierarchy), and thus the approach may not scale to transform source data of large size, particularly when the transformation needs to be performed quickly.

In another prior approach, a processor reads the tags in the entire source data in a sequential manner (e.g., using Simple API for XML (SAX), described in further detail in the book entitled "SAX2" by David Brownell, published by O'Reilly with ISBN 0-596-00237-8.) and applies the set of transformation rules on the tags. The memory requirements are reduced due to the sequential processing of the tags. However, the overall computational complexity (number of computations required) may be enhanced due to the sequential processing of the source tags, as is also well known in the relevant arts.

What is therefore needed is an approach, which addresses one or more problems/requirements described above.

BRIEF DESCRIPTION OF THE DRAWINGS

The present invention will be described with reference to the accompanying drawings briefly described below.

FIG. 4A depicts the content of a set of transformation rules mapping source data in a source markup language to target data in a target markup language in an illustrative example.

FIG. 4B depicts the content of a set of referenced tags identified from the set of transformation rules depicted in FIG. 4A in an illustrative example.

FIG. 5A depicts the content of source data specified in a source markup language in an illustrative example.

FIG. 5B depicts the content of target data specified in a target markup language generated from the source data of FIG. 5A and using the transformation rules of FIG. 4A in an illustrative example.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, a set of transformation rules is preprocessed and the source tags ("referenced tags"), which need to be processed to apply the transformation rules of other source tags, are identified and stored in memory. Various benefits may be attained as a result.

According to another aspect of the present invention, when the source tags of a source data are processed, the content of source tags matching the referenced tags is conveniently stored associated with the corresponding referenced tag. As a result, when subsequent source tags requiring the content of the referenced tags are processed, the content of the referenced tags is readily available. As a result, the processing requirements are reduced without requiring substantially more memory.

According to one more aspect of the present invention, the relative paths of any referenced tags are replaced by the absolute paths or names (unique identifiers, in general) and the resulting changed transformation rules are stored in a memory. The memory may be chosen to be a non-volatile memory to facilitate reuse of the same information over multiple sessions (with reboot of the system in between).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
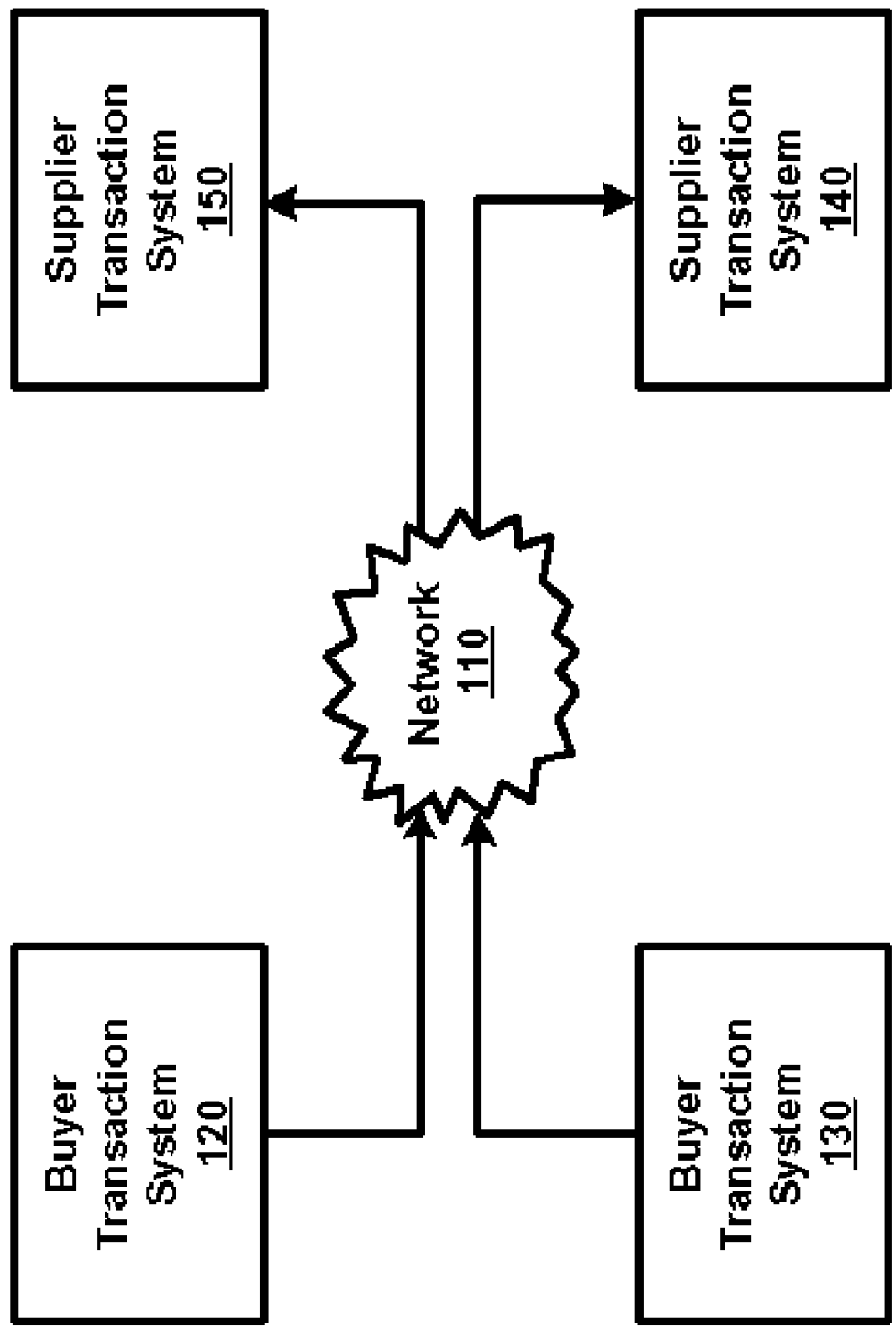
FIG. 1 is a block diagram of an example environment in which various aspects of the present invention can be implemented.

FIG. 1 is a block diagram illustrating an example environment in which various aspects of the present invention can be implemented. The environment is shown containing network 110, buyer transaction systems 120 and 130, and supplier transaction systems 140 and 150.

Network 110 provides the connectivity between the remaining systems using protocols such as Internet Protocol (IP). Buyer transaction systems 120 and 130 (or buyers using these systems) may purchase a desired service/product from supplier transaction systems (140 or 150) using a B2B transaction. A B2B transaction is typically conducted by sending a request containing data ("source data") specifying the details of the desired service/product. Buyer transaction systems 120 and 130 may use different markup languages (for example XML, HTML) or different tags in the same markup language to specify the identical details of the desired service/product.

Supplier transaction systems 140 and 150 represent example transaction systems using which services/products can be purchased using B2B transactions. Supplier transaction system 150 may receive the details of the desired service/product from buyer transaction systems 120 and 130 in the form of documents containing details according to a markup language (XML).

Supplier transaction system 150 may have a common internal representation containing data ("target data") specifying the details of the services/products that can be purchased from it. For conciseness it is assumed that both the received/source data and the target data are represented in XML format, but using different tags. Thus, supplier transaction system 150 requires the transformation of the XML documents sent by the buyer transaction systems 120 and 130 to the common internal representation (in XML).

Supplier transaction system 150 may achieve the above transformation by using a set of transformation rules, which defines a mapping between the tags ("source tags") in the XML documents sent by the buyer transaction systems and the tags ("target tags") in the common internal representation. Different sets of transformation rules may be used by supplier transaction system 150 for transformation based on the markup language and the tags used by buyer transaction systems 120 and 130.

In a typical B2B environment, the number of transactions taking place between the buyer and supplier systems is often very large. Accordingly, it may be necessary to quickly (using fewer processing cycles) convert the source data to target data so that the responses are also provided in a timely manner. In addition, it may be desirable to reduce memory requirements since the source data can also be large in size. Various aspects of the present invention help in handling such a large volume of transactions while meeting one or more of such requirements, as described below in further detail.

3. Preprocessing of Transformation Rules

Figure 2:
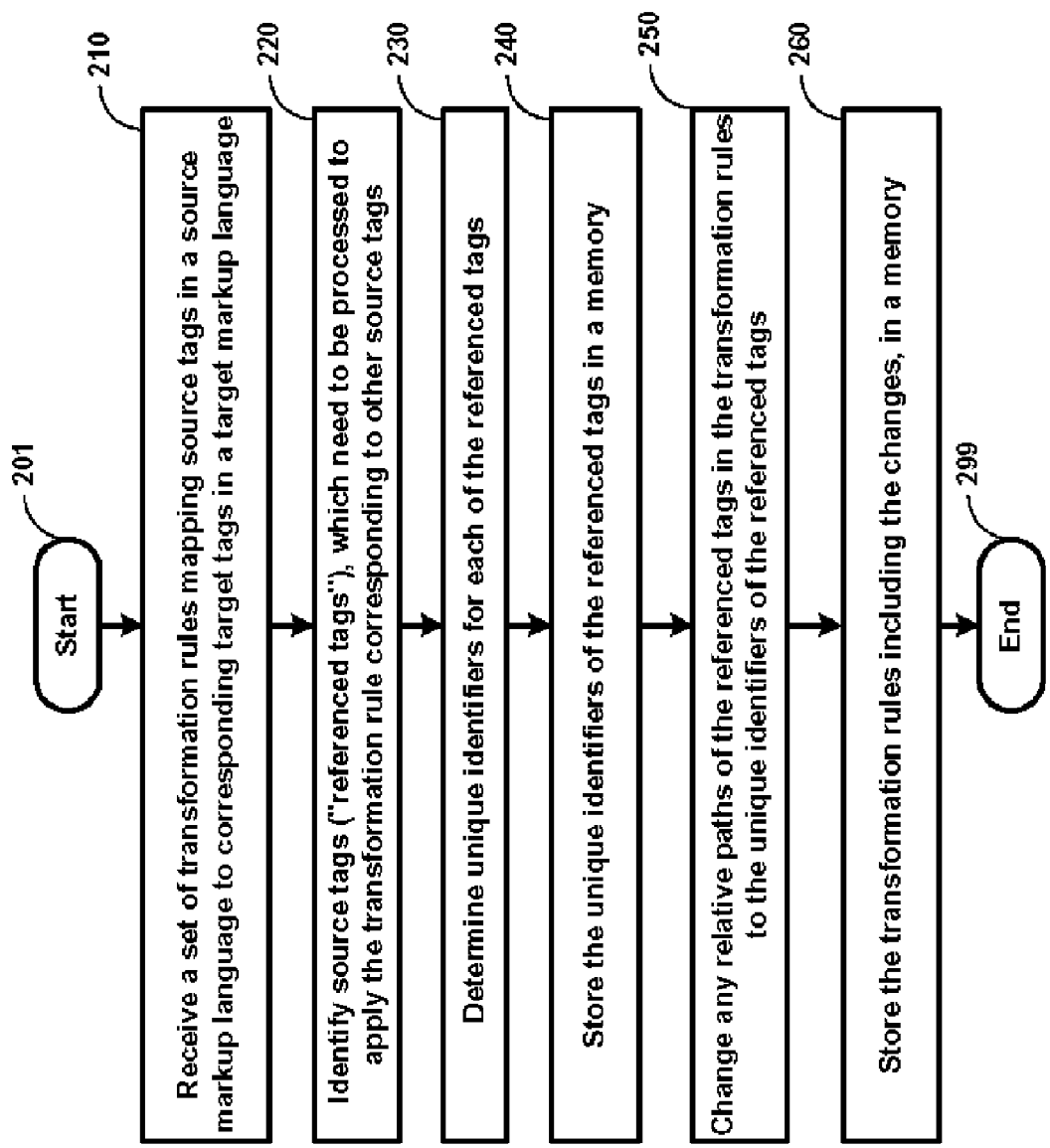
FIG. 2 is a flowchart illustrating the manner in which transformation rules are preprocessed according to an aspect of the present invention.

FIG. 2 is a flowchart illustrating the manner in which a set of transformation rules are preprocessed to identify referenced tags according to an aspect of the present invention. The flowchart is described with respect to FIG. 1 merely for illustration. The features can however be implemented in other types of systems/environments as will be apparent to one skilled in the relevant arts by reading the disclosure provided herein. The flowchart begins in step 201, in which control passes to step 210.

In step 210, supplier transaction system 150 receives a set of transformation rules mapping source tags in a source markup language to corresponding target tags in the target markup language. In an embodiment, the set of transformation rules is specified in an XSL document stored at supplier transaction system 150. The transformation rules may be determined based on the respective conventions used by each of the buyer transaction systems and each of the supplier transaction systems.

In step 220, supplier transaction system 150 identifies source tags ("referenced tags") in the set of transformation rules, which need to be processed to apply the transformation rule corresponding to other source tags. There can be various types of referenced tags. For example, source tags specified multiple times in the transformation rules form referenced tags and the transformation rules may need to be examined to locate repeated tags. Similarly, certain types of transformation rules (for example, a transformation rule containing a condition) necessitating the processing of earlier tags are determined and the source tags specified in such transformation rules are identified as the referenced tags.

In step 230, supplier transaction system 150 determines unique identifiers for each of the referenced tags. Each tag in a data specified in a markup language can be uniquely identified by its name or by a path (containing the names of tags) from the beginning of the data ("absolute path"). For example, XML Path Language (XPath) is a terse (non-XML) syntax for addressing portions of an XML document as is well known in the relevant arts. It may be appreciated that the absolute path of a referenced tag can be determined by examining the set of transformation rules. Other approaches to determine unique identifiers, suitable to the specific environment will be apparent to one skilled in the relevant arts.

In step 240, supplier transaction system 150 stores the unique identifiers of the referenced tags in a memory. It may be appreciated that the steps 210, 230 and 230 are sufficient to identify the referenced tags and as such transformation of source data to target data (described below with respect to FIG. 3) can be performed with the set of transformation rules and the identified reference tags.

In step 250, supplier transaction system 150 changes any relative paths of the referenced tags in the transformation rules to the unique identifiers of the referenced tags. A relative path of a tag in a data is a path from another tag in the data (and not from the beginning of the data). Thus, by changing any relative paths specified in the transformation rules to the names or absolute paths, the processing of the transformation rules may be made more efficient while performing the transformation of source data to target data (as described below with reference to FIG. 3).

In step 260, supplier transaction system 150 stores the transformation rules including the changes in memory. In an embodiment, an XSL document (containing the transformation rules) may be modified by changing all relative XPaths to absolute XPaths and stored in secondary storage. The flowchart ends in step 299.

Once the transformation rules have been preprocessed, supplier transaction system 150 may receive the source data from buyer transaction systems 120 and 130 and transform the source data to target data. The changed transformed rules and the unique identifiers of the referenced tags may be stored in a secondary memory if such data is to be reused (to avoid unneeded recomputation). However, during processing, the stored data needs to be provided from a random access memory while transforming the source data to target data as described in detail below.

4. Transformation of Source Data to Target Data

Figure 3:
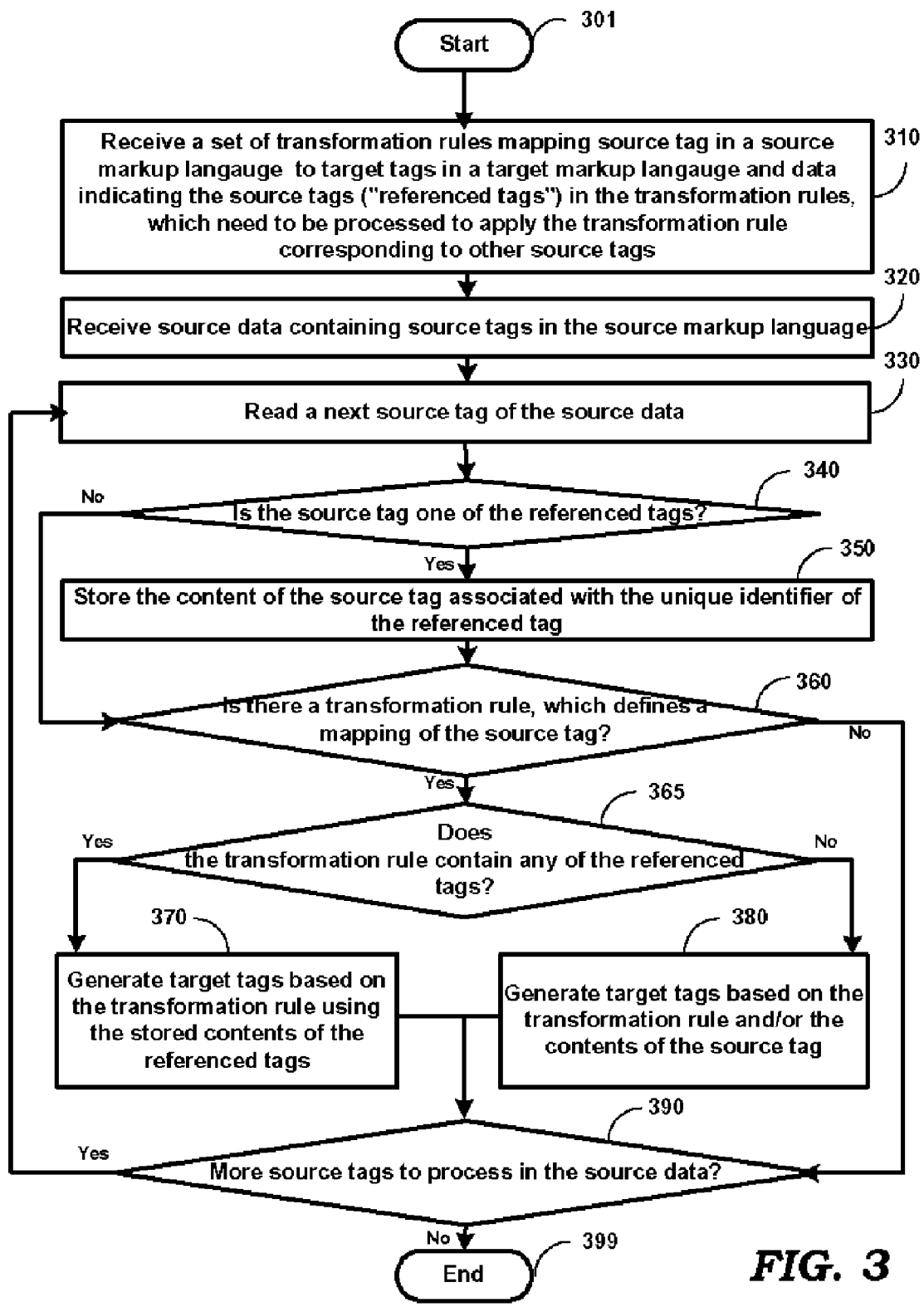
FIG. 3 is a flowchart illustrating the manner in which source data in a source markup language is transformed into target data in a target markup language using transformation rules and referenced tags according to an aspect of the present invention.

FIG. 3 is a flowchart illustrating the manner in which transformation of source data in a source markup language to target data in target markup language can be performed using a set of transformation rules and the referenced tags in the set of transformation rules according to an aspect of the present invention. The flowchart is described with respect to FIG. 1 merely for illustration. The features can however be implemented in other types of systems/environments as will be apparent to one skilled in the relevant arts by reading the disclosure provided herein. The flowchart begins in step 301, in which control passes to step 310.

In step 310, supplier transaction system 150 receives a set of transformation rules mapping source tags in a source markup language to target tags in a target markup language and a set of source tags ("referenced tags"), which need to be processed to apply transformation rules corresponding to other source tags. The set of transformation rules may be specified in an XSL document and pre-processed as described above with respect to FIG. 2.

In step 320, supplier transaction system 150 receives source data containing source tags specified in the source markup language from buyer transaction systems 120 and 130. In an embodiment, the source data is specified in an XML document.

In step 330, supplier transaction system 150 reads a next source tag of the source data. In an embodiment, step 330 is implemented by using a SAX parser well known in the relevant arts. SAX parser is described in further detail in the book titled "SAX2" by David Brownell, published by O'Reilly with ISBN 0-596-00237-8.

In step 340, supplier transaction system 150 checks whether the source tag is one of the referenced tags. In an embodiment, such checking is performed by comparing the names or the absolute XPaths of the source tag and the referenced tags. Control passes to step 350 if the source tag is one of the referenced tags, and to step 360 otherwise.

In step 350, supplier transaction system 150 stores the content of the source tag associated with the unique identifier of the referenced tag in memory. In an embodiment, the contents of the source tags and the unique identifiers of the referenced tags are stored as key-value pairs in a hash table in memory.

In step 360, supplier transaction system 150 checks whether there is a transformation rule defining a mapping of the source tag. Control passes to step 365 if a mapping is found, and to step 390 otherwise. In step 365, supplier transaction system 150 checks whether the transformation rule contains any of the referenced tags. In an embodiment, an XSL processor is used to perform such checks of steps 360 and 365.

Control passes to step 370 if a referenced tag is found, and to step 380 otherwise. In step 370, supplier transaction system 150 generates target tags of the target data based on the transformation rule using the stored contents of the referenced tags. Such generation of target tags, where the transformation rule contains previous source tags is facilitated due to the preprocessing of the transformation rules and the identification of the reference tags. Control then passes to step 390.

In step 380, supplier transaction system 150 generates target tags of the target data based on the transformation rule and the contents of the source tag. In step 390, supplier transaction system 150 checks whether there are additional source tags in the source data for processing. Control passes to step 330 if more source tags are found, and to step 399 otherwise. The flowchart ends in step 399.

Though not expressly shown in FIG. 3 for conciseness (and to avoid obscuring the features of the invention), it should be appreciated that multiple transformation rules may define mapping of the same source tag, and steps 365, 370 and 380 would be executed for each matching transformation rule.

It may be further appreciated that the flowchart of FIG. 3 provides an approach using which source data is converted to target data using a set of transformation rules and the referenced tags in the set of transformation rules. The memory requirements in such conversion may be reduced since the number of referenced tags (stored in memory) typically will be appreciably smaller compared to the number of tags present in the source data. The processing complexity of conversion is also reduced due to the preprocessing described above.

The description is continued with respect to an example illustrating the approaches described above in relation to FIGS. 2 and 3.

5. Illustration

FIGS. 4A and 4B together are used to illustrate the manner in which the approach(es) of FIG. 2 can be used to preprocess a set of transformation rules to identify referenced tags according to an aspect of the present invention. Each Figure is described below in further detail.

FIG. 4A depicts the contents of a XSL document containing a set of transformation rules mapping source tags in a source markup language XML to target tags in a target markup language (XML). Lines 401-403 specify some header information like the XML version, the style sheet version and the type of output document that needs to be generated.

Line 410 specifies a transformation rule between the source tag "CustomerType" and the target tag "PurchaserType". Lines 411-429 specify a transformation rule that is applied to each occurrence of source tag "Line" in the source data and generates a number of target tags like "Item" (line 412), "ItemNumber" (line 413) and "TotalPrice" (line 416).

As may be observed, the transformation rule for source tag "Line" contains a reference to source tag "CustomerType" (in line 415) specified by the relative path " . . . \CustomerType". Accordingly, the content of source tag "CustomerType" is necessary to apply the transformation rule for source tag "Line" thereby identifying "CustomerType" as a referenced tag. Similarly, from lines 418 and 424, the source tag "Currency" can be identified as a referenced tag, required for transforming the source tag "Line".

Thus, in lines 401-433 of FIG. 4A, supply transaction system 150 identifies "Currency" and "CustomerType" as referenced tags. Steps 230 and 240 may then be performed to generate the content of FIG. 4B, described below.

FIG. 4B depicts the content of a file containing the referenced tags in the set of transformation rules depicted in FIG. 4A. The referenced tags "CustomerType" and "Currency"

identified from the set of transformation rules depicted in FIG. 4A are stored using the unique identifiers "PurchaseOrder/Header/CustomerType" and "PurchaseOrder/Header/Currency" in Lines 470 and 475 respectively.

It may be appreciated that as per step 250, the name "CustomerType" in Line 410 and the relative path " . . . \CustomerType" in line 415 are changed to "PurchaseOrder/Header/CustomerType" and the document is stored with the changes made. The changed XSL document along with the referenced tags depicted in FIG. 4B may be used for transforming source data to target data using the approach of FIG. 3.

The description is continued with respect to the manner in which the target data of FIG. 5B can be generated from the source data of FIG. 5A using the transformation rules specified in FIG. 4A and the referenced tags of FIG. 4B using the approach of FIG. 3.

FIGS. 5A and 5B together are used to illustrate the manner in which the approach(es) of FIG. 3 can be used to transform source data in a source markup language to target data in a target markup language using a set of transformation rules and the referenced tags in the set of transformation rules. Each Figure is described below in further detail.

FIG. 5A depicts the contents of a source document containing the source data in XML. Lines 509 and 508 specify contents "Gold" and "USD" corresponding to the referenced tags "PurchaseOrder/Header/CustomerType" and "PurchaseOrder/Header/Currency" of FIG. 4B, which are stored in memory as per step 350. Lines 510-514 specify a source tag "Line" that needs to be transformed according to the transformation rules of FIG. 4A. Lines 515 to 519 specify another tag with the same role as the source tag of lines 510-514.

FIG. 5B depicts the contents of a target document containing the target data in XML generated from the source data shown in FIG. 5A using the transformation rules specified in the XSL document of FIG. 4A and the reference tags of FIG. 4B. Lines 501 and 551 specify some header information like the XML version, the character encoding to be used for the XML documents of FIGS. 5A and 5B respectively.

The manner in which the content of FIG. 5B is generated by processing the content of FIG. 5A, is described below in further detail (assuming that a Replacement XSL parser is modified to provide the features described herein).

Supplier transaction system 150 reads "PuchaseOrder" of line 502 as the next source tag in step 330. From step 340, control passes to step 360 since "PurchaseOrder" not indicated to be a referenced tag in FIG. 4B. Control then passes to step 390 since there is no transformation rule in FIG. 4A for "PurchaseOrder". As there are more tags to be processed, control then transfers to step 330.

Source tag "Header" of line 503 is read as the next tag in step 330. Control passes to step 380 via decision steps 340 (not a referenced tag), 360 (transformation rule exists at lines 406-431), and 365 (transformation rule does not contain reference tag). In step 380, target tags of lines 552-555 and line 564 are generated without the contents of the tags.

Control then passes to step 330 via step 390, and source tag "PONumber" of line 504 is read as the next tag. Control passes to step 380 similar to source tag "Header". In step 380, the content of the target tag "PONumber" in line 553 is generated from the content ("1234") of the source tag.

The source tags "SupplierName" and "CustomerName" of lines 505 and 506 respectively are read sequentially and processed similar to "PurchaseOrder" source tag since there are no transformation rules specified for the tags (and no corresponding target tags are generated). The source tag "CustomerID" of line 507 is read next and is processed similar to "PONumber" source tag using the transformation rule in line 409 and in step 380 the contents ("Cust01") of the target tag "PurchaserID" is generated in line 554.

Control then passes to step 330 via step 390, and source tag "Currency" of line 508 is read as the next tag. From step 340, control passes to step 350 since the absolute path of "Currency" is identical to line 475 of a referenced tag in FIG. 4B. The content ("USD") of the "Currency" tag is stored in memory in step 350. In step 360, no matching transformation rule is found, since the transformation rules of lines 418 and 424 are specified as a part of the transformation rule for the source tag "Line".

Control passes to step 330 via step 390, and source tag "CustomerType" of line 509 is read as the next tag. The content ("Gold") of the tag is stored in memory at step 350 reached via step 340 since the source tag is a referenced tag. In step 360, the transformation rule of line 415 is not matched, since it is specified as a part of the transformation rule for the source tag "Line". In step 360, the transformation rule of line 410 is matched and control passes to step 370 where the content of the target tag "PurchaserType" of line 555 is generated from the content stored in memory.

It may be appreciated that the conversion to absolute paths (steps 250 and 260) of the reference tags in the transformation rules, facilitates the accurate matching of reference tags to the source tags in step 360. As a result, the computational complexity is reduced.

The next source tag read is "Line" in line 510, which is processed similar to the "Header" source tag till step 365. At step 365, control passes to step 370 since the transformation rule in lines 411-419 contains the referenced tags "CustomerType" and "Currency".

At step 370, the target tags of lines 556-559 without the contents of the target tags may be generated. Line 558 is partially generated based on the transformation rule specified in lines 414-427. The contents of the referenced tag "CustomerType" is matched to "Gold" in line 415 and the content of the target tag "TotalPrice" is generated as "Price*0.9" if they match and as "Price" otherwise. The partial content of the target tag "TotalPrice" is generated from the content ("USD") of the referenced tag "Currency" stored in memory.

It may be appreciated that the transformation of source tag "Line" requires the content of the source tag "CustomerType". Various aspects of the present invention enable such transformation to be performed sequentially with minimal resources due to the preprocessing and identification of some source tags (e.g., "CustomerType") as reference tags. The description is continued with reference to the manner in which the content of the target tag of source tag "Line" is generated.

On reading the next source tag "ItemNo" of line 511, the process flow is similar to "PONumber" and at step 380, the transformation rule of line 413 is applied to generate the contents ("1001") of the "ItemNumber" from the contents of the source tag "ItemNo". The corresponding transformed output is shown in line 557. The next source tag "ItemName" of line 512 is processed similar to the source tag "PurchaseOrder" (and no target tags are generated) since there is no matching transformation rule for the tag.

The next source tag read is "Price" of line 513, which is then processed similar to "ItemNo" and at step 380, the content ("10000") of the source tag is used to generate the partial content ("9000", since the "CustomerType" is "Gold" as explained in detail above) of the target tag "TotalPrice" of line 558.

The other source tags in lines 515-519 are sequentially read and the target tags in lines 560-563 are generated similar to the source tag "Line" in line 510 as explained in detail above.

It may be appreciated that in the above described embodiments, memory is required for the storage of the contents of the referenced tags of FIG. 4B. Thus, the memory requirement are reduced for the transformation of source XML document of FIG. 5A to target XML document of FIG. 5B according to various features of the present invention.

While both the source and target markup languages are identical in the above described embodiments, it should be appreciated that the features described above can be extended to environments in which the source and target markup languages are different, as will be apparent to one skilled in the relevant arts by reading the disclosure provided herein.

Figure 6:
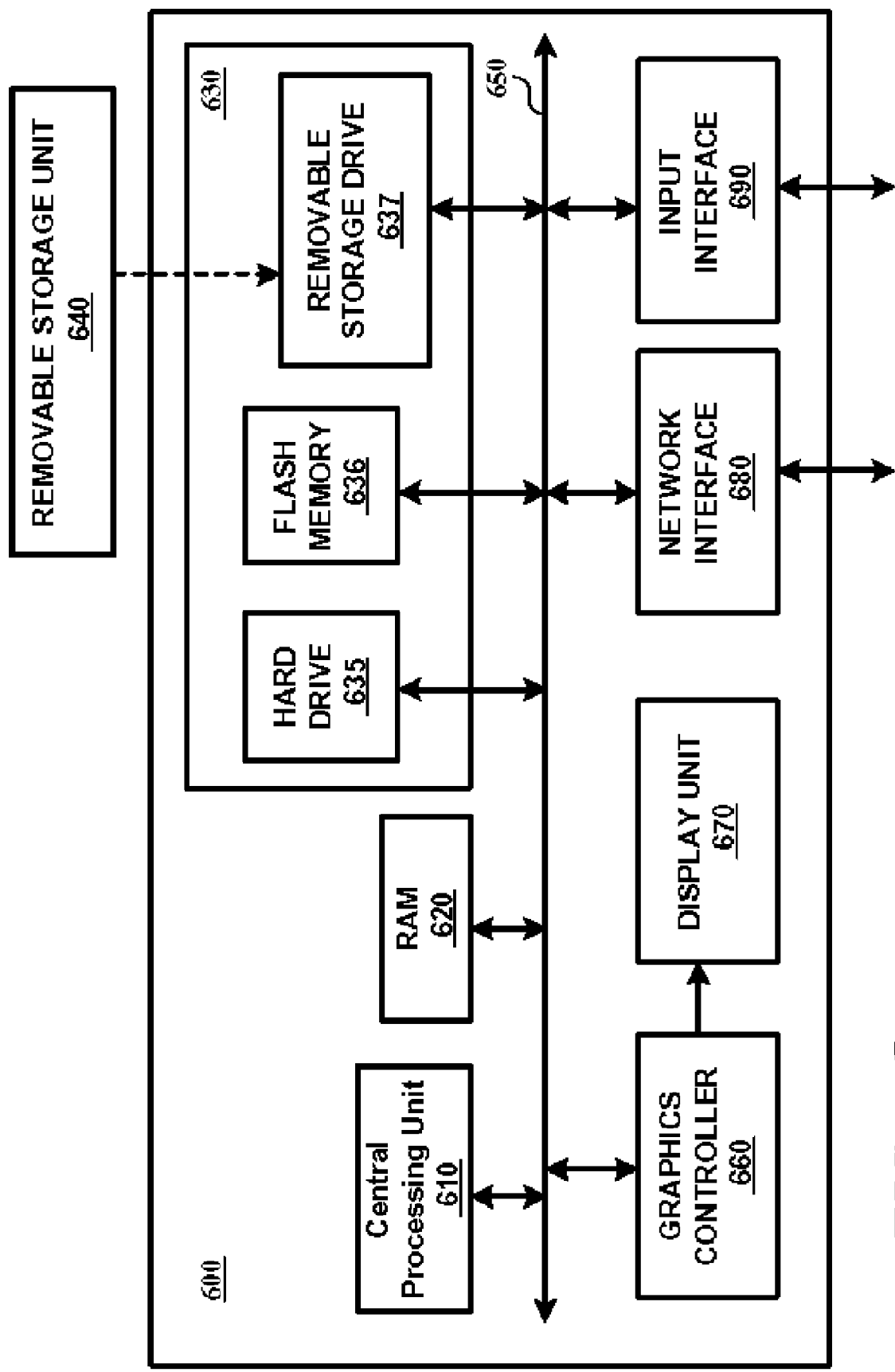
FIG. 6 is a block diagram illustrating an example embodiment in which various aspects of the present invention are operative when software instructions are executed.

Also the embodiments described above can be implemented in a combination of one or more of hardware, software and firmware, as suitable for the specific environment. In general, when cost is of consideration, the implementation may be performed using more of software and when performance is of primary consideration, the implementation may be performed using more of hardware. The description is continued with respect to an embodiment in which 6. Digital Processing System FIG. 6 is a block diagram illustrating the details of digital processing system 600 in which various aspects of the present invention are operative by execution of appropriate software instructions. Digital processing system 600 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose-processing unit. RAM 620 may receive instructions from secondary memory 630 using communication path 650. RAM 620 may also store the referenced tags and the changed transformation rules, described above.

Graphics controller 660 generates display signals (e.g., in RGB format) to display unit 670 based on data/instructions received from CPU 610. Display unit 670 contains a display screen to display the images defined by the display signals. Input interface 690 may correspond to a key-board and/or mouse. Network interface 680 provides connectivity to a network (e.g., using Internet Protocol), and may be used to communicate with other external systems (not shown), for example to receive/send source/target data.

Secondary memory 630 may contain hard drive 635, flash memory 636 and removable storage drive 637. Secondary memory 630 may store the data (e.g., the source data, target data, transformation rules, changed transformation rules, referenced tags all described in sections above) and software instructions (causing desired transformation, described above), which enable digital processing system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

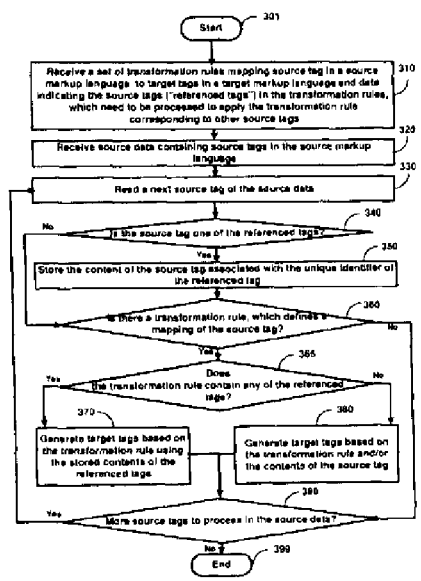

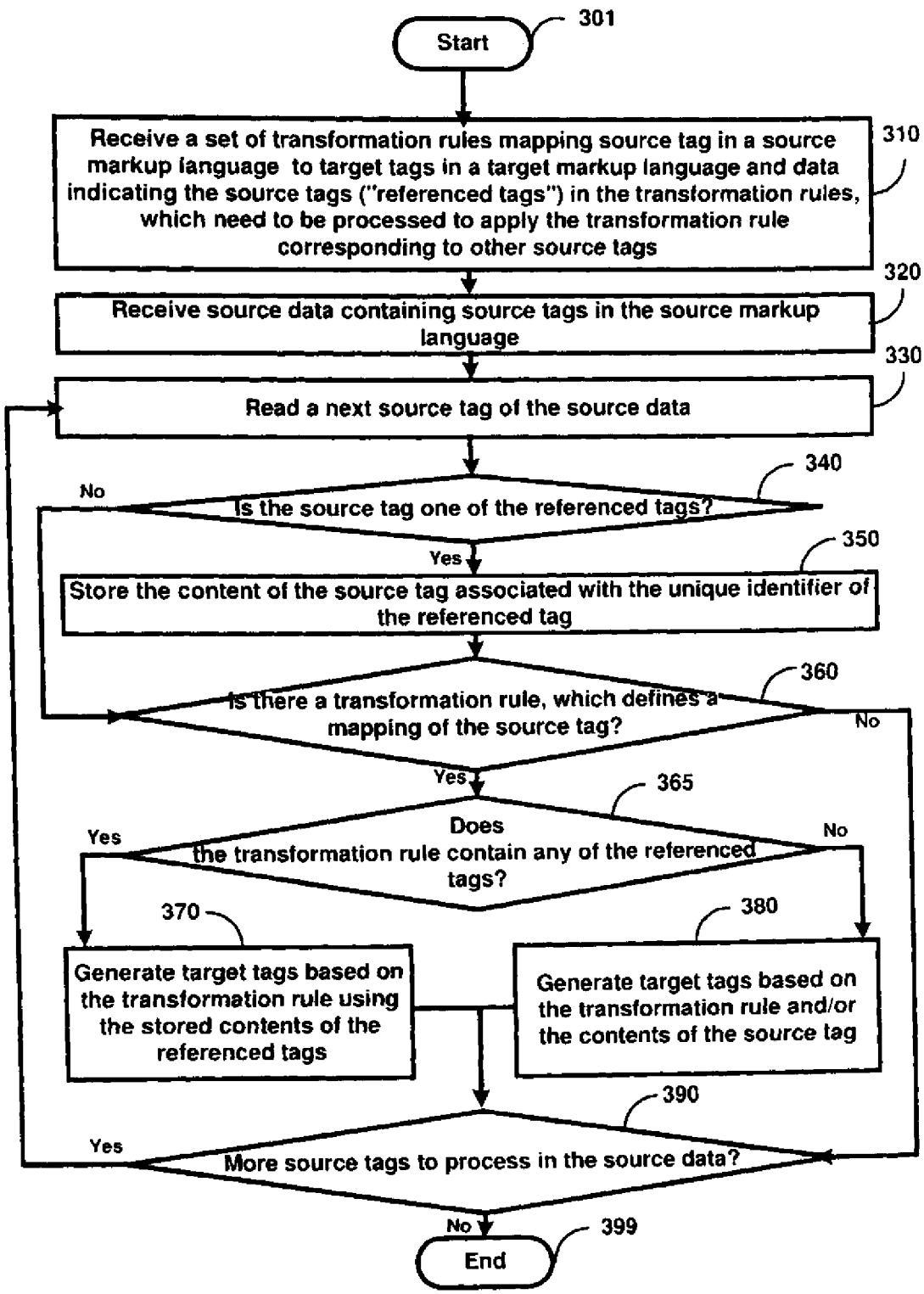

What is claimed is:

1. A method of transforming a source data in a source markup language to a target data in a target markup language according to a set of transformation rules, said set of transformation rules defining mappings of a plurality of source tags in said source markup language to a plurality of target tags in said target markup language, each of said plurality of source tags having an associated content in said source data, said method being implemented in a digital processing system, said method comprising:

receiving said set of transformation rules;

pre-processing said set of transformation rules to identify a plurality of referenced tags in said set of transformation rules, wherein each of said plurality of referenced tags is one of said plurality of source tags in said source markup language, wherein said set of transformation rules specify that the content of each of said plurality of reference tags is needed to apply at least one transformation rule of another source tag, wherein said set of transformation rules further specify that the transformation of said another source tag is performed after applying the transformation rules designed to generate the content of the corresponding reference tag when transforming said source data to said target data;

storing said plurality of referenced tags identified by said pre-processing in a memory;

retrieving sequentially each of said plurality of source tags from said source data after said pre-processing and said storing, and for each retrieved source tag:

if the retrieved source tag is one of said plurality of referenced tags, storing the content of the retrieved source tag associated with said one of said plurality of referenced tags in said memory;

if said plurality of transformation rules contain a transformation rule defining a corresponding mapping for the retrieved source tag, generating a portion of said target data based on said corresponding mapping defined in said transformation rule and the content of retrieved source tag, wherein said generating retrieves said content of a first referenced tag from said memory for use with said corresponding transformation rule in forming said portion if said corresponding transformation rule includes said first referenced tag.

2. The method of claim 1, wherein each of said plurality of referenced tags is represented by a unique identifier in said memory.

3. The method of claim 2, further comprising, in said pre-processing, changing any relative paths of any of said plurality of referenced tags in said set of transformation rules to corresponding unique identifiers and storing a resulting changed set of transformation rules in another memory, wherein the unique identifiers and said changed set of transformation rules are used in processing each of the retrieved source tags.

4. The method of claim 3, wherein each of said memory and said another memory comprises a non-volatile memory.

5. The method of claim 2, wherein said unique identifier comprises an absolute path according to XPath convention.

6. The method of claim 1, wherein a first reference tag is specified in multiple transformation rules of said set of transformation rules defining mapping corresponding to respective source tags, wherein said pre-processing identifies said first reference tag as one of said plurality of referenced tags by having been specified multiple times in said set of transformation rules.

7. A method of transforming a source data in a source markup language to a target data in a target markup language according to a set of transformation rules, wherein said source markup language defines a plurality of source tags, each of said plurality of source tags having an associated content in said source data, said target markup language defines a plurality of target tags, said set of transformation rules defines a mapping of a source tag to one or more target tags, said method comprising:

determining a first referenced tag in said set of transformation rules, wherein said set of transformation rules specify that the content of said first referenced tag is needed to apply a transformation rule defining a mapping of a second source tag while forming said target data from said source data according to said transformation rules, wherein said set of transformation rules further specify that the transformation of said second source tag is performed after applying the transformation rules designed to generate the content of said first reference tag when transforming said source data to said target data, wherein said first referenced tag and said second source tag are contained in said plurality of source tags and said transformation rule is contained in said set of transformation rules;

reading said first referenced tag, along with the associated content, from said source data;

storing said content associated with said first referenced tag in a memory upon said reading of said first referenced tag from said source data;

reading said second source tag from said source data after said storing; and generating a portion of said target data by applying said transformation rule using said content, wherein said generating retrieves said content from said memory for use with said transformation rule in forming said portion.

8. The method of claim 7, wherein said storing stores said content associated with a unique identifier of said first referenced tag, wherein said content of said second source tag is retrieved from said memory based on said unique identifier during said generating of said portion.

9. The method of claim 8, further comprising:

reading a third source tag from said source data, a third transformation rule contained in said set of transformation rules defining a mapping of said third source tag to a subset of target tags contained in said plurality of target tags, said third transformation rule not requiring content of any other source tags for completion of mapping; and generating another portion of said target tags from said third transformation rule, or and/or a content of said third source tag, or a combination thereof.

10. The method of claim 8, further comprising:

reading a fourth source tag from said source data, a fourth plurality of transformation rules defining a mapping of said fourth source tag to a fourth subset of target tags, said fourth plurality of transformation rules containing said transformation rule, said fourth plurality of transformation rules being contained in said set of transformation rules; and generating a third portion of said target data from said fourth subset of target tags and said content after retrieving said content from said memory.

11. The method of claim 7, wherein first referenced tag is determined by examining only said set of transformation rules, and not said source data.

12. The method of claim 11, wherein said determining is performed as a pre-processing operation prior to receiving said source data in said source markup language for transforming, whereby said determining is performed prior to said reading of said second source data from said source data.

13. A computer readable storage medium storing one or more sequences of instructions for causing a system to transform a source data in a source markup language to a target data in a target markup language according to a set of transformation rules, said set of transformation rules defining mappings of a plurality of source tags in said source markup language to a plurality of target tags in said target markup language, each of said plurality of source tags having an associated content in said source data, wherein execution of said one or more sequences of instructions by one or more processors contained in said system causes said one or more processors to perform the actions of:

receiving said set of transformation rules;

pre-processing said set of transformation rules to identify a plurality of referenced tags in said set of transformation rules, wherein each of said plurality of referenced tags is one of said plurality of source tags in said source markup language, wherein said set of transformation rules specify that the content of each of said plurality of reference tags is needed to apply at least one transformation rule of another source tag, wherein said set of transformation rules further specify that the transformation of said another source tag is performed after applying the transformation rules designed to generate the content of the corresponding reference tag when transforming said source data to said target data;

storing said plurality of referenced tags identified by said pre-processing in a memory;

retrieving sequentially each of said plurality of source tags from said source data after said pre-processing and said storing, and for each retrieved source tag:
   if the retrieved source tag is one of said plurality of referenced tags, storing the content of the retrieved source tag associated with said one of said plurality of referenced tags in said memory;
   if said plurality of transformation rules contain a transformation rule defining a corresponding mapping for the retrieved source tag generating a portion of said target data based on said corresponding mapping defined in said transformation rule and the content of retrieved source tag,
  wherein said generating retrieves said content of a first referenced tag from said memory for use with said corresponding transformation rule in forming said portion if said corresponding transformation rule includes said first referenced tag.

14. The computer readable storage medium of claim 13, further comprising storing a unique identifier of each of said plurality of referenced tags in said memory.

15. The computer readable storage medium of claim 14, further comprising, in said pre-processing, changing any relative paths of any of said plurality of referenced tags in said set of transformation rules to corresponding unique identifiers and storing a resulting changed set of transformation rules in another memory,
  wherein the unique identifiers and said changed set of transformation rules are used in processing each of the retrieved source tags.

16. A computer readable storage medium storing one or more sequences of instructions for causing a system to transform a source data in a source markup language to a target data in a target markup language according to a set of transformation rules, wherein said source markup language defines a plurality of source tags, each of said plurality of source tags having an associated content in said source data, said target markup language defines a plurality of target tags, said set of transformation rules defines a mapping of a source tag to one or more target tags, and execution of said one or more sequences of instructions by one or more processors contained in said system causes said one or more processors to perform the actions of:
  determining a first referenced tag in said set of transformation rules,
  wherein said set of transformation rules specify that the content of said first referenced tag is to needed to apply a transformation rule defining a mapping of a second source tag while forming said target data from said source data according to said transformation rules,
  wherein said set of transformation rules further specify that the transformation of said second source tag is performed after applying the transformation rules designed to generate the content of said first reference tag when transforming said source data to said target data,
  wherein said first referenced tag and said second source tag are contained in said plurality of source tags and said transformation rule is contained in said set of transformation rules;
  reading said first referenced tag, along with the associated content, from said source data;
  storing said content associated with said first referenced tag in a memory upon said reading of said first referenced tag from said source data;
  reading said second source tag from said source data after said storing; and
  generating a portion of said target data by applying said transformation rule using said content, wherein said generating retrieves said content from said memory for use with said transformation rule in forming said portion.

17. The computer readable storage medium of claim 16, further comprising:
  reading a third source tag from said source data, a third transformation rule contained in said set of transformation rules defining a mapping of said third source tag to a subset of target tags contained in said plurality of target tags, said third transformation rule not requiring content of any other source tags for completion of mapping; and
  generating another portion of said target tags from said third transformation rule, or and/or a content of said third source tag, or a combination thereof.

18. The computer readable storage medium of claim 16, further comprising:
  receiving a fourth source tag from said source data, a fourth plurality of transformation rules defining a mapping of said fourth source tag to a fourth subset of target tags, said fourth plurality of transformation rules containing said transformation rule, said fourth plurality of transformation rules being contained in said set of transformation rules; and
  generating a third portion of said target data from said fourth subset of target tags and said content after retrieving said content from said memory.

19. A computing system comprising:
  a processor;
  a memory; and
  a machine readable storage medium storing a set of instructions, which when retrieved into said memory and executed by said processor causes said computing system to perform a set of actions to transform a source data in a source markup language to a target data in a target markup language according to a set of transformation rules, said set of transformation rules defining a mapping of a plurality of source tags in said source markup language to a plurality of target tags in said target markup language, each of said plurality of source tags having an associated content in said source data, said set of actions comprising:
   receiving said set of transformation rules;
   pre-processing said set of transformation rules to identify a plurality of referenced tags in said set of transformation rules, wherein each of said plurality of referenced tags is one of said plurality of source tags in said source markup language,
   wherein said set of transformation rules specify that the content of each of said plurality of reference tags is needed to apply at least one transformation rule of another source tag;
   wherein said set of transformation rules further specify that the transformation of said another source tag is performed after applying the transformation rules designed to generate the content of the corresponding reference tag when transforming said source data to said target data;
   storing said identified plurality of referenced tags in said memory;
   retrieving sequentially each of said plurality of source tags from said source data, and for each retrieved source tag:
    if the retrieved source tag is one of said plurality of referenced tags, storing the content of the retrieved source tag associated with said one of said plurality of referenced tags in said memory;

if said plurality of transformation rules contain a transformation rule defining a corresponding mapping for the retrieved source tag, generating a portion of said target data based on said corresponding mapping defined in said transformation rule and the content of retrieved source tag, wherein said generating retrieves said content of a first referenced tag from said memory for use with said corresponding transformation rule in forming said portion if said corresponding transformation rule includes said first referenced tag.

20. A computing system comprising:

a processor;

a memory; and a computer readable storage medium storing a set of instructions, which when retrieved into said memory and executed by processor causes said computing system to perform a set of actions to transform a source data in a source markup language to a target data in a target markup language according to a set of transformation rules, wherein said source markup language defines a plurality of source tags, each of said plurality of source tags having an associated content in said source data, said target markup language defines a plurality of target tags, said set of transformation rules defines a mapping of a source tag to one or more target tags, said set of actions comprising:

determining a first referenced tag in said set of transformation rules, wherein said set of transformation rules specify that the content of said first referenced tag is needed to apply a transformation rule defining a mapping of a second source tag while forming said target data from said source data according to said transformation rules, wherein said set of transformation rules further specify that the transformation of said second source tag is performed after applying the transformation rules designed to generate the content of said first reference tag when transforming said source data to said target data, wherein said first referenced tag and said second source tag are contained in said plurality of source tags and said transformation rule is contained in said set of transformation rules;

reading said first referenced tag, along with the associated content, from said source data;

storing said content of associated with said first referenced tag in a memory upon said reading of said first referenced tag from said source data;

reading said second source tag from said source data after reading said storing; and generating a portion of said target data from by applying said transformation rule using said content, wherein said generating retrieves said content from said memory for use with said transformation rule in forming said portion.

* * * * *

UNITED STATES PATENT AND TRADEMARK OFFICE
CERTIFICATE OF CORRECTION

| | | |
|---|---|---|
| PATENT NO. | : 8,286,075 B2 | Page 1 of 3 |
| APPLICATION NO. | : 11/308655 | |
| DATED | : October 9, 2012 | |
| INVENTOR(S) | : Puthiyaveettil | |

It is certified that error appears in the above-identified patent and that said Letters Patent is hereby corrected as shown below:

The title page showing the illustrative figure should be deleted to be replaced with the attached title page.

In the drawing sheets, consisting of Fig. 3, should be deleted to be replaced with the drawing sheet, consisting of Fig. 3, as shown on the attached pages.

In the Specification:

In column 7, line 43, delete "PuchaseOrder" and insert -- PurchaseOrder --, therefor.

In the Claims:

In column 12, line 15, in Claim 9, delete "and/or a" and insert -- a --, therefor.

In column 13, line 10, in Claim 13, delete "tag" and insert -- tag, --, therefor.

In column 13, line 48, in Claim 16, delete "is to" and insert -- is --, therefor.

In column 14, line 15, in Claim 17, delete "and/or a" and insert -- a --, therefor.

Signed and Sealed this
Twenty-fourth Day of December, 2013

Margaret A. Focarino
*Commissioner for Patents of the United States Patent and Trademark Office*

(12) United States Patent
Puthiyaveettil

(10) Patent No.: US 8,286,075 B2
(45) Date of Patent: Oct. 9, 2012

(54) REDUCING RESOURCE REQUIREMENTS WHEN TRANSFORMING SOURCE DATA IN A SOURCE MARKUP LANGUAGE TO TARGET DATA IN A TARGET MARKUP LANGUAGE USING TRANSFORMATION RULES

(75) Inventor: Manikantan Vannadil Puthiyaveettil, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1577 days.

(21) Appl. No.: 11/308,655

(22) Filed: Apr. 19, 2006

(65) Prior Publication Data
US 2007/0214411 A1 Sep. 13, 2007

(30) Foreign Application Priority Data
Mar. 7, 2006 (IN) .......................... 393/CHE/2006

(51) Int. Cl.
*G06F 17/00* (2006.01)
(52) U.S. Cl. .................. 715/236; 715/234; 715/239
(58) Field of Classification Search .................. 715/236
See application file for complete search history.

(56) References Cited

U.S. PATENT DOCUMENTS

| | | | | |
|---|---|---|---|---|
| 7,073,120 B2* | 7/2006 | Torii et al. | | 715/239 |
| 7,146,565 B2* | 12/2006 | Toyama et al. | | 715/239 |
| 7,392,468 B2* | 6/2008 | Igata et al. | | 715/203 |
| 7,437,666 B2* | 10/2008 | Ramarao et al. | | 715/235 |
| 7,480,856 B2* | 1/2009 | Jones | | 715/234 |
| 7,530,017 B2* | 5/2009 | Kinno et al. | | 715/249 |
| 2002/0143821 A1* | 10/2002 | Jakubowski | | 707/522 |
| 2003/0037076 A1* | 2/2003 | Bravery et al. | | 707/517 |
| 2004/0034830 A1* | 2/2004 | Fuchs et al. | | 715/501.1 |
| 2004/0187076 A1* | 9/2004 | Ki et al. | | 715/513 |
| 2004/0268231 A1* | 12/2004 | Tunning | | 715/513 |
| 2004/0268249 A1* | 12/2004 | Fennelly et al. | | 715/523 |
| 2005/0060648 A1* | 3/2005 | Fennelly et al. | | 715/523 |
| 2005/0086584 A1* | 4/2005 | Sampathkumar et al. | | 715/501.1 |
| 2006/0101332 A1* | 5/2006 | Imielinski et al. | | 715/513 |

\* cited by examiner

*Primary Examiner* — Laurie Ries
*Assistant Examiner* — Zaida I Marrero
(74) *Attorney, Agent, or Firm* — Narendra Reddy Thappeta

(57) ABSTRACT

Transforming source data in a source markup language to target data in a target markup language using transformation rules mapping source tags to corresponding target tags. In an embodiment, the transformation rules (e.g., in an XSL) are preprocessed to identify and store source tags ("referenced tags"), which need to be processed to apply the transformation rules of other source tags. The source tags in the source data (e.g., XML) are retrieved sequentially (e.g., by SAX parser) and the contents are stored in memory if the source tag is one of the identified referenced tags. The target tags are generated (e.g., as XML) using the contents stored in memory for another source tag matching a transformation rule immediately upon reading the source tag. Only a few of the contents of source tags and the identifiers of the referenced tags may need to be stored in memory. As a result, the memory requirements may be reduced.

20 Claims, 6 Drawing Sheets